United States Patent [19]

Goto et al.

[11] Patent Number: 5,478,129
[45] Date of Patent: Dec. 26, 1995

[54] MOVABLE PHOTO VEHICLE

[75] Inventors: Teruki Goto, Ohmiya; Shojiro Tsuboi, Yaizu, both of Japan

[73] Assignee: Kinoshita & Iwahashi, Tokyo, Japan

[21] Appl. No.: 139,969

[22] Filed: Oct. 21, 1993

[30] Foreign Application Priority Data

Oct. 22, 1992 [JP] Japan .................. 4-079414 U

[51] Int. Cl.$^6$ .................................................. B60P 3/025
[52] U.S. Cl. ..................... 296/24.1; 52/2.19; 52/2.22; 135/88.13; 296/26
[58] Field of Search ............................. 296/24.1, 26, 27, 296/172, 173, 176; 52/2.13, 2.21, 2.18, 2.19, 2.22; 135/102, 103

[56] References Cited

U.S. PATENT DOCUMENTS

| | | | |
|---|---|---|---|
| 2,353,820 | 7/1944 | Eddins | 296/26 |
| 2,797,124 | 6/1957 | Hauptli | 296/26 |
| 3,402,960 | 9/1968 | Erke | 52/2.19 X |
| 3,899,853 | 8/1975 | Wertman | 52/2.18 |

FOREIGN PATENT DOCUMENTS

| | | | |
|---|---|---|---|
| 0512001 | 1/1954 | Belgium | 52/2.22 |
| 2535658 | 5/1984 | France | 296/176 |
| 4-13431 | 2/1992 | Japan . | |

*Primary Examiner*—David M. Mitchell
*Assistant Examiner*—Kia M. Robinson
*Attorney, Agent, or Firm*—Eugene E. Renz, Jr.

[57] ABSTRACT

A movable photo studio vehicle having an interior space for use by persons. A body is mounted on a chassis and is fitted with a roof actuatable to a raised position forming part of the interior space. Side boards are hinged on the body so as to be rotatable by 90° to a horizontal position to further define part of the interior space. A plurality of spaced apart flexible pipes are mounted between the end of the side board and the side portion of the roof with a sheet attached. Connecting pipes are provided for supplying air to a group of pipes to expand the sheet to an arcuate position to still further define part of the space without limiting access to the space.

1 Claim, 7 Drawing Sheets

MOVABLE PHOTO VEHICLE

FIELD OF THE INVENTION

The present invention relates to improvements in movable photo studio vehicles.

BACKGROUND OF THE INVENTION

In recent times, certain types of advertising materials for products such as videos and motion pictures have., been made outside of a motion picture or photography studio at an on site location where the products are made or used. In these instances, the photographic apparatus or devices have been brought to the site which can be done readily. However, in a number of instances, it is not possible to move a photographic studio and this presents a problem in the finishing process of the photographic works. Accordingly, it is desirable to develop a movable photo studio.

To this end, the Applicant of the present invention has previously developed a photo studio vehicle which is disclosed in Japanese UM Application Laid-open No. 4(1992)-13431. The photo studio vehicle shown therein comprises an internal lower frame $A_1$ mounted on chassis, an external upper frame $A_2$ mounted for sliding movement relative to the lower frame $A_1$ on columns 1 disposed at four corners of the external frame as illustrated in FIGS. $7^a$–$7^b$ The upper external frame $A_2$ has a side roof board 2a on the upper side thereof mounted in a manner to be permitting rotation through an arc of 90°. A first side board $2^a$ is hinged at one end of the side roof board $2^a$ and a second side board $2^c$ is hinged on the first side board $2^b$. A floor board three is provided on the lower side of the internal frame $A_1$ which is likewise mounted in a manner to be rotatable in through an arc of 90°. A fore and aft side board 4 including a side board member $4^a$ is fixed on a carriage 5. A second side board $4^b$ is hinged on the first side board $4^a$ and a third side board $4^c$ is further hinged on the second side board $4^c$, all contained in the internal frame $A_1$.

The photo studio vehicle just described can be used and operated in the following manner. The vehicles first stop at a specified photographing location and then the external frame $A_2$ is lifted by a drive motor not shown. An arm 6 is then erected to raise the side roof board $2^a$ to horizontal position. Subsequentially, the first side board $2^b$ is hung through a wire rope 8 by means of a side board cylinder 7. The second side board $2^c$ is suspended through a wire rope 10 by actuation of second side board cylinder 9. The same operation is repeated for the fight and left side boards to thereby extend the side portion of the external frame $A_2$ sideways. Thereafter, the floor board 3 is extended sideways and the fore and aft side board 4 is moved on the floor board via of the casters 11. By this arrangement, the second side board $4^b$ and the third side board $4^c$ are erected on the side board $4^a$ on the carriage side board $4^a$ on the carriage 5 and suitably fixed at both sides thereof. With respect with the fore and aft sides the same operation is performed, thus, assembling the photo studio vehicle to the configuration shown in FIG. 7. A photographer has access through a doubled leafed hinged door 12.

Even though the studio just described is useful for the purposes intended, there are nevertheless certain disadvantages and drawbacks. For example, it has been found that it is difficult to achieve the necessary degree of parallelism in the longitudinal and width wise directions and, thus, the expansion and contraction of the photo studio is rather tedious and time consuming. Moreover, the studio described above has a rather large number of parts which are expensive to manufacture and difficult to maintain. Additionally, it has been observed that a number of the parts need to be made of metal and this increases the weight of the total assembly.

SUMMARY OF THE INVENTION

With the foregoing in mind, it is an object of the present invention to provide a studio vehicle characterized by the novel features of construction and arrangement which is easy to expand and contract and is of a considerably more simplified construction and reduced in weight.

To this end, a movable photo studio vehicle in accordance with the present invention comprises a body 13 mounted on a chassis and a roof 15 actuatable relative to the body 13. A side board 14 is hingedly connected to the lower portion of the body 13 in a manner to permit rotation 90° sideways. A plurality of flexible hollow pipes 16 are mounted between the outer edge of the side boards and the edge portion of the roof. A sheet 21 is supported on the pipes and connecting extension pipes 17 are mounted on the side portions of the roof 15 which function as air supply conduits. Accordingly, a group of the pipes can be supplied with air and expanded to thereby extend the sheet 21.

BRIEF DESCRIPTION OF THE DRAWINGS

These and other objects of the present invention and the various features and details of the operation and construction thereof are hereinafter more fully set forth with reference to the accompanying drawings, where.

FIG. $7^a$ is a perspective view of a known studio vehicle shown in Japanese Utility Model No. 13431/1992:

FIG. $7^b$ is an enlarged fragmentary sectional view-taken on lines $7^b$—$7^b$ of FIG. $7^a$; and FIG. $7^c$ is an enlarged view as viewed along the lines $7^c$—$7^c$ of FIG. $7^a$.

DETAILED DESCRIPTION OF THE PREFERRED EMBODIMENT

Figure 1:
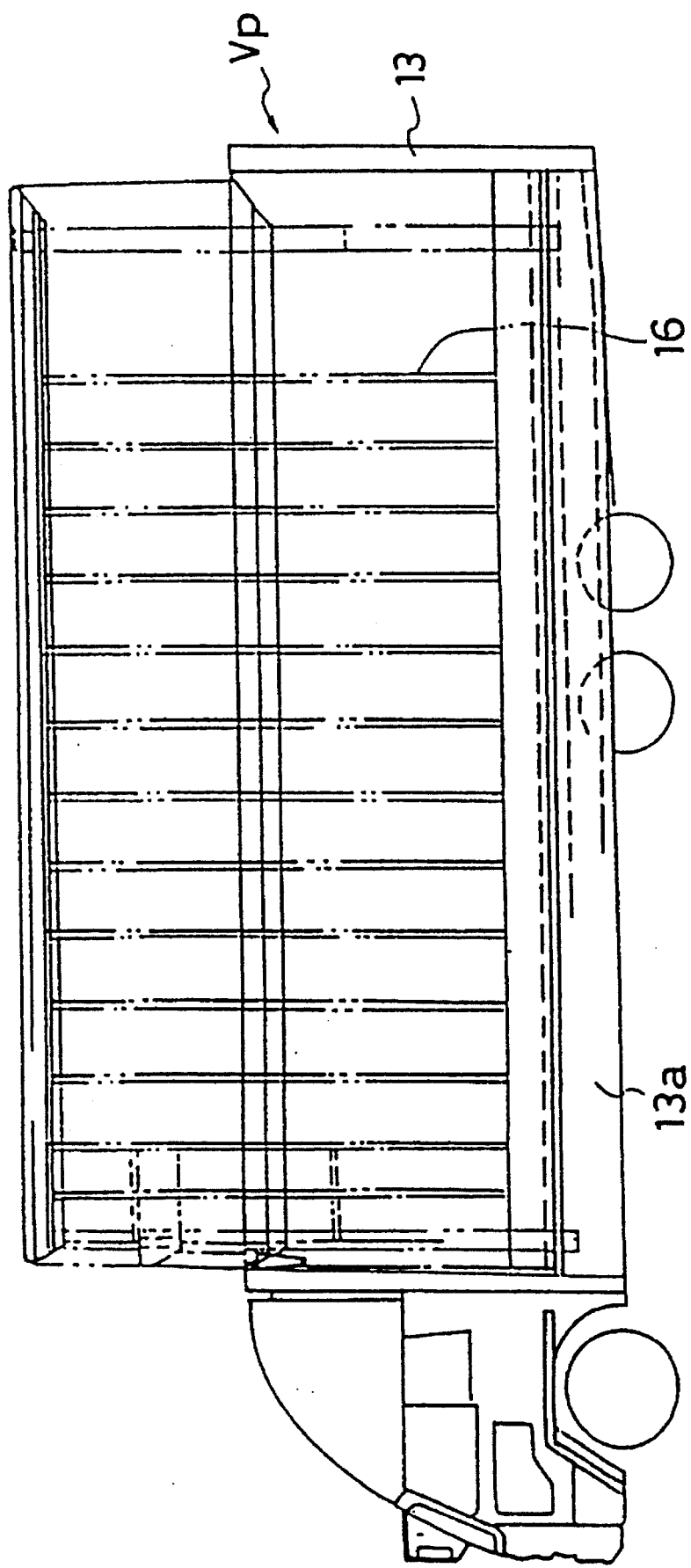
FIG. 1 is a side elevational view of a studio vehicle construction in accordance with the present invention.
Figure 2:
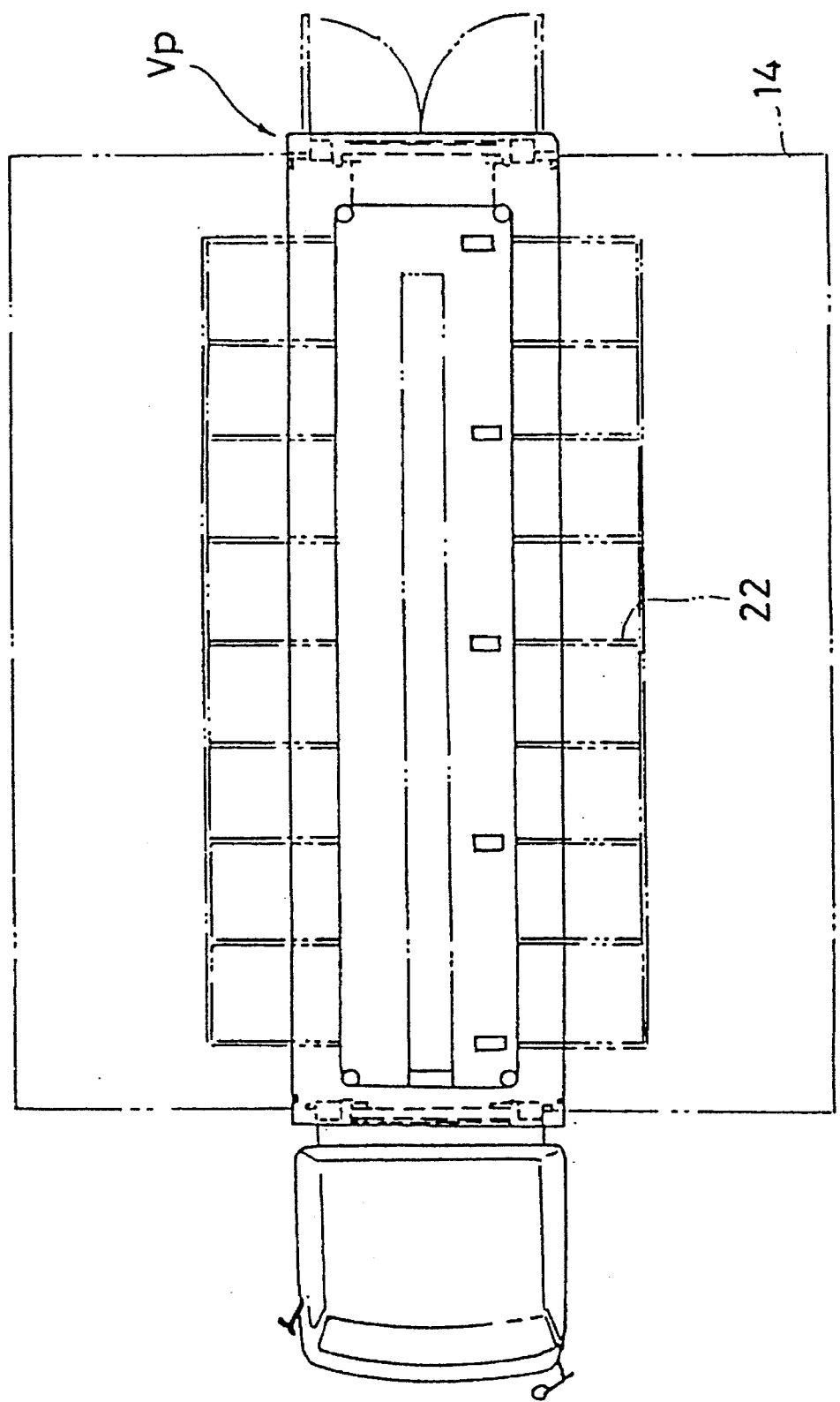
FIG. 2 is a top plan view thereof with panels deployed, portions shown in dot and dash lines and some elements removed for clarity.
Figure 3:
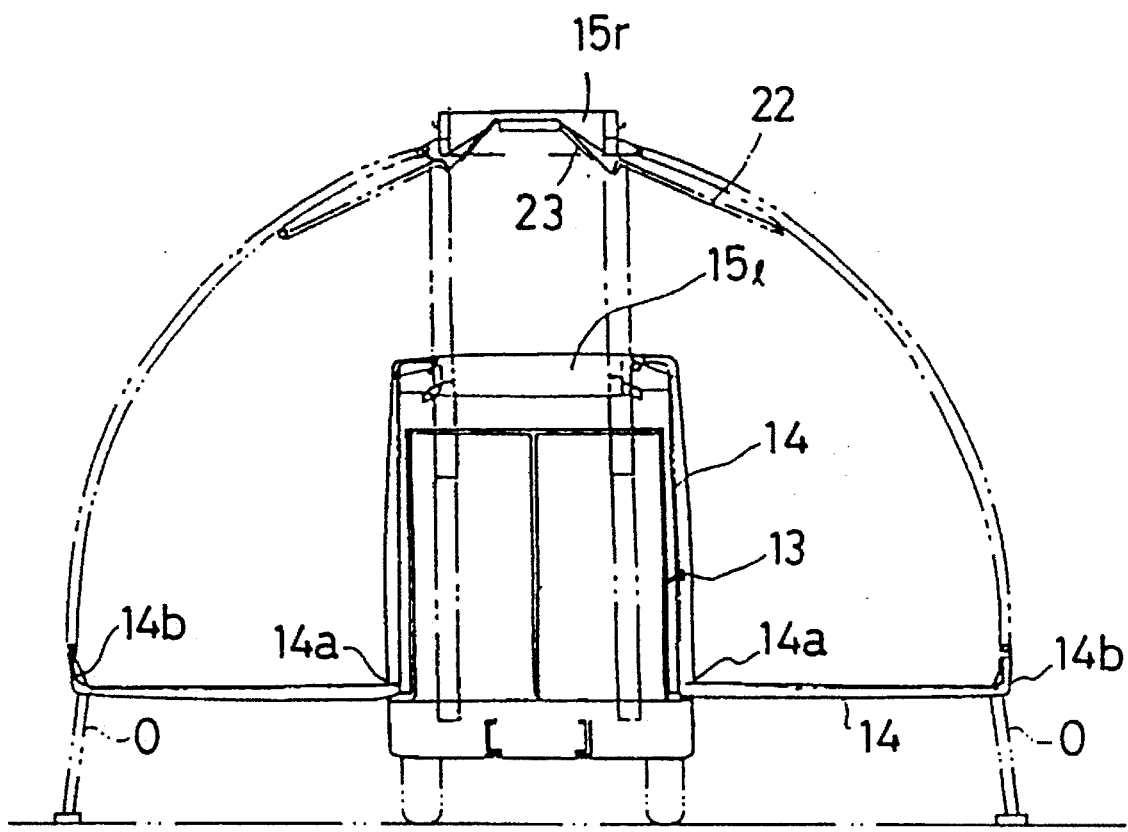
FIG. 3 is a rear end elevational view of the vehicle shown in FIG. 1.
Figure 4:
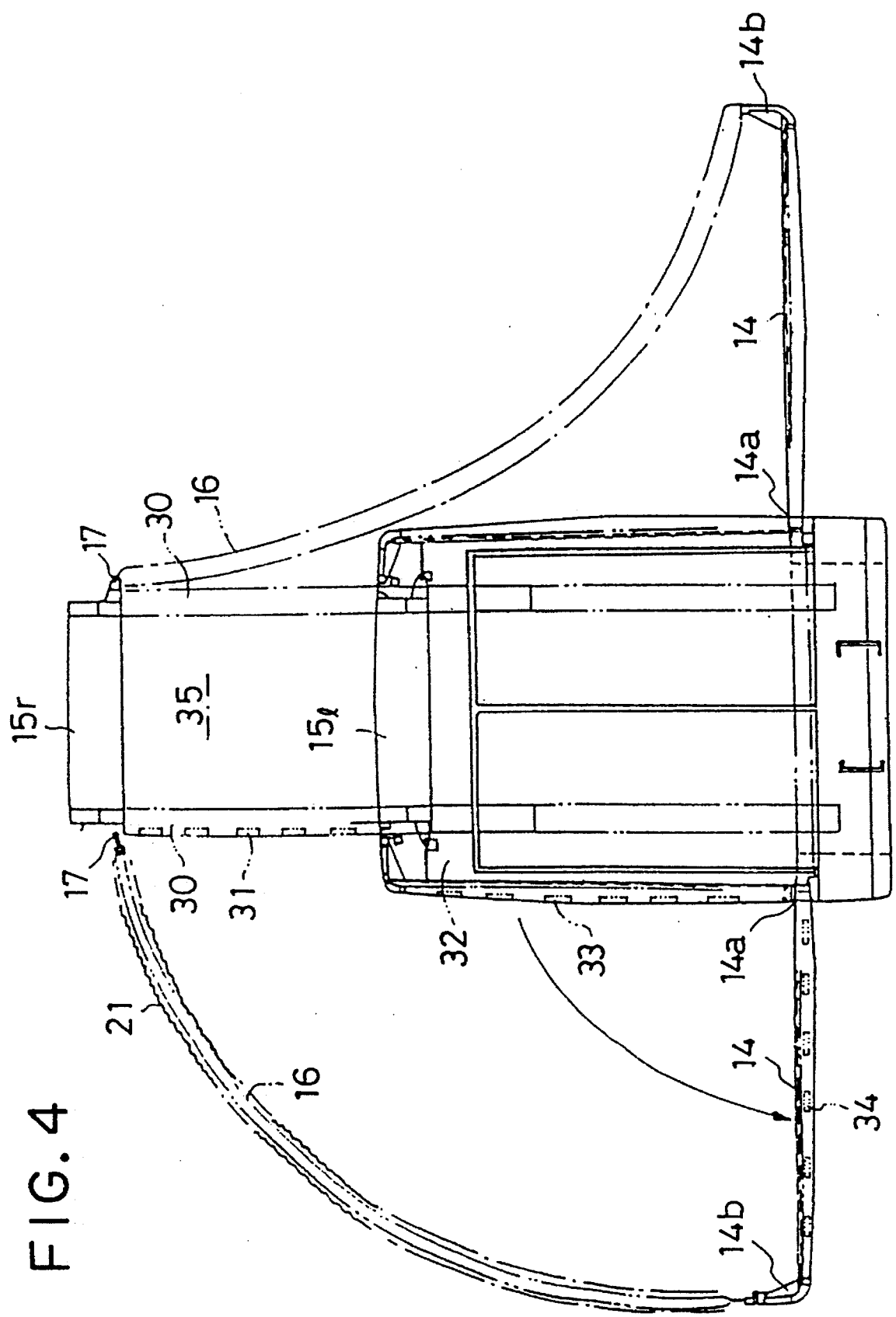
FIG. 4 is an enlarged view similar to FIG. 3 wherein the left side of the view shows the position of the pans when the seat is extended whereas the right half side of the view shows the state where the means inflating the mechanism is removed.
Figure 5:
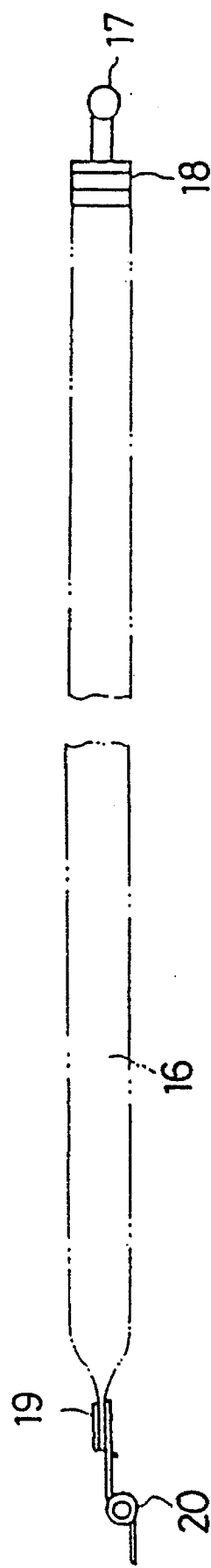
FIG. 5 is an enlarged view of the seats supporting pipes.
Figure 6:
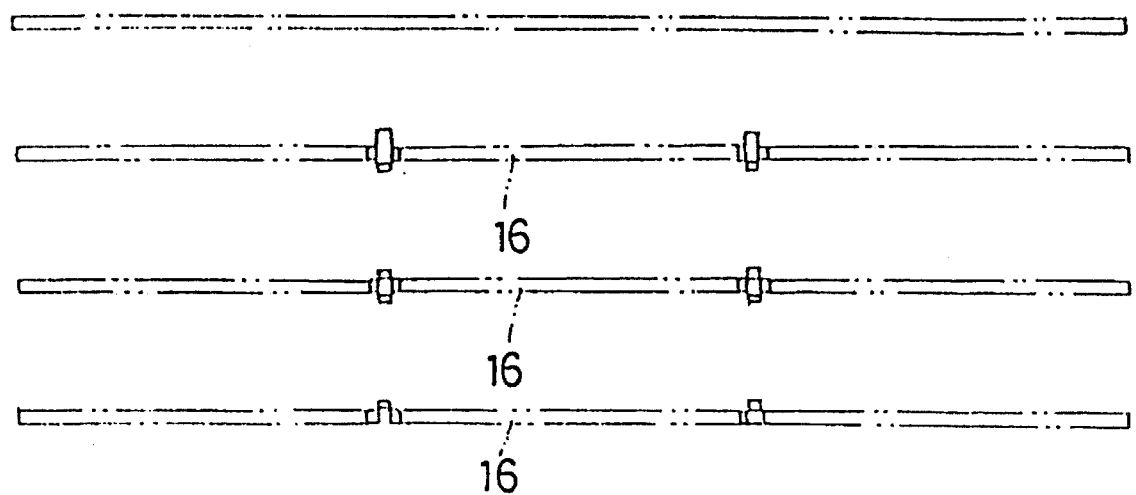
FIG. 6 is an assembly view of the pipes.
Figure 7A:
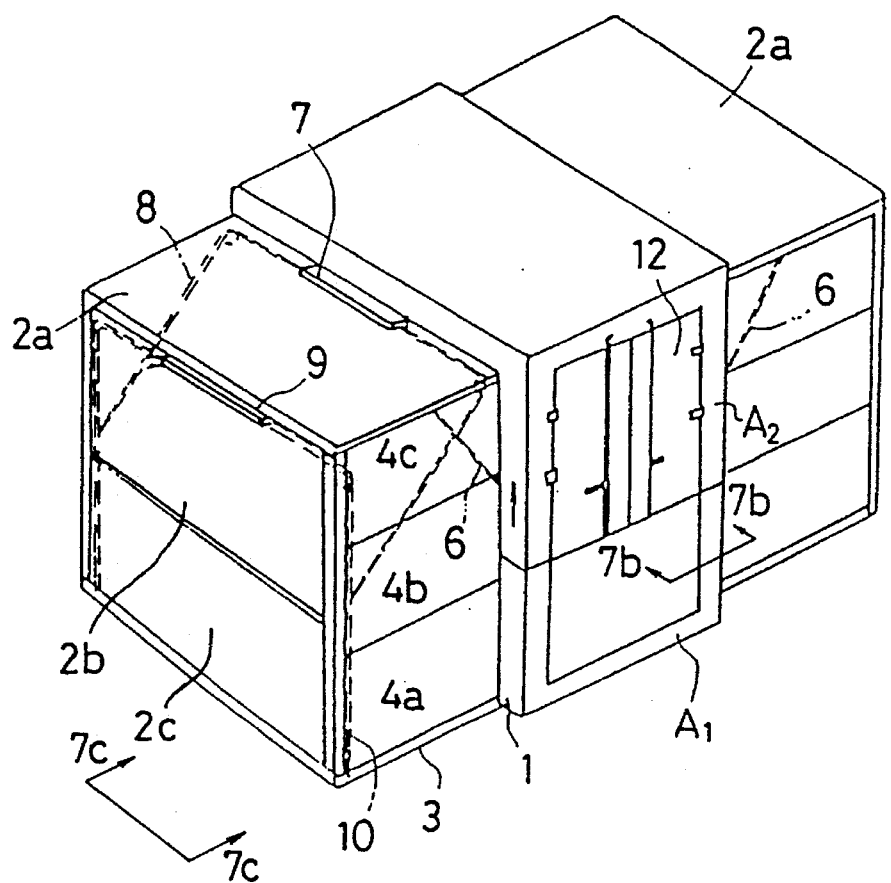
Figure 7C:
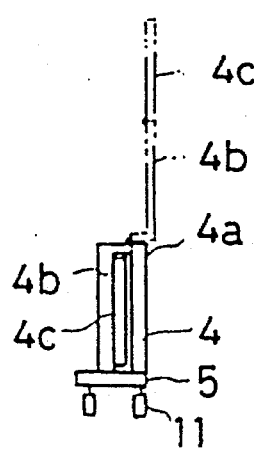
Figure 7B:
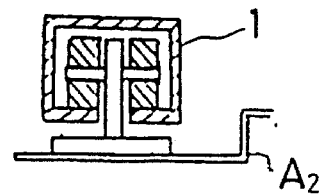

Referring now to the drawings and particularly to FIGS. 1–4 thereof, there is shown a movable photo studio vehicle generally designate by $V_p$ incorporating features of the present invention. The vehicle $V_p$ comprises an elongated generally rectangular body member 13 mounted on a truck chassis $13^a$. The body 13 includes a roof 15 actuatable vertically relative to the body portion 13 between a lower position designated $15_1$ and extended or raised position designated $15_r$ (See FIG. 3). Side boards 14, 14 hingedly mounted as at $14^a$ to the lower side edge portion of the body 13 are actuatable through an arc of 90° sideways from a vertical upstanding position to a lower horizontally disposed position. These positions are best illustrated in FIGS. 3 and 4. The outer ends of the side boards terminate in flanges $14^b$ which serve as anchoring means for one end of a plurality of inflatable, flexible, tubular members 16, shown in FIG. 6. The tubular members 16 are spaced along the outer edge of the side boards 14 in the manner illustrated in FIG. 2 and extend between the anchors $14^b$ and roof 15. More specifically, the lower terminal ends of the flexible tube member 16 mount a clamp 19 secured to one leaf of a hinge mechanism 20 which in turn is secured to the flange $14^b$ (see FIGS. 4 and 5). Conduits forming a manifold 17 are provided on opposite side edge portions of the roof 15 which are connected to a suitable pressurized air supply to thereby facilitate inflation and expansion of the flexible tubular members 16 to the outwardly bowed shaped shown in left hand side of FIG. 4. The hollow tubular members 16 are connected at their upper ends through a so-called hose connector 18 to the manifold 17.

The roof 15 is adapted for actuation between lower and raised positions described above by suitable lifting mechanism (not shown) such as a chain mechanism or a hydraulic piston-cylinder actuator.

A suitable flexible enclosure in the form of a flexible sheet 21 forms an outer cover over the inflated tubular members 16 in the manner shown in FIG. 4. Means are provided for assisting in the support of the tubular members in the raised arcuate position shown in FIG. 3 comprising a pair of elongated rectangular panels 22 pivotally mounted adjacent opposite side edges of the roof 15 and actuatable between a lower vertical position and an extended gull winged position by a piston-cylinder actuator 23 as shown in FIG. 3.

Consider now the operation of a photo vehicle Vp in accordance with the present invention. When the vehicle has arrived at the photo location, the side boards 14 are dropped to the lower horizontal position forming floor boards. Outriggers O may be provided to stabilize the boards 14. The roof 15 is then raised to its upper limit position and the piston-cylinder actuator 23 activated to position support panels 22 in expanded outwardly directed position so that upon pressurization of the tubular members 16 they are outwardly bowed as shown in FIG. 3. It is noted that pressurized air is supplied to the hollow tubular members 16 via manifold 17. The flexible sheet 21 provides a covering for the studio vehicle forming an enlarged tent-like structure providing expanded capacity for operation and manipulation of the photographic equipment.

The end member of the flexible sheet or covering 21 is in substantially a quarter-circular form as best shown in FIG. 4. Before expansion, the post members 30, 30 which have been in the lowered position are raised by means of a suitable actuating mechanism (not shown) as shown in FIG. 4. The upper, upright end portion of the rear end member of the sheet or covering 21 may be secured to the post member 30 by means of a plurality of the fittings 31 provided in the post member 30. The lower, upright end portion of the rear end member of the sheet or covering 21 may be secured to the door frame structure 32 by means of a plurality of the fittings 33 provided in the door frame structure 32.

On the other hand, the lower end portion of the rear end member of the sheet or covering 21 may be secured to the side board 14 by means of a plurality of the fittings 34 provided in the rear end of the side board 14.

The remaining opening between the pair of the post members 30, 30 may be covered by means of a folding panel 35 which is accommodatable within the door frame structure 32.

The front end of the vehicle may be covered in a similar manner. Thus, the tent-like structure as a whole may be enclosed in all four sides leaving an entrance door at the rear end.

Summarizing the invention as described, a plurality of flexible pipes support a sheet attached to the pipes so that when it is desired to expand the studio, the tubular pipes are supplied with air and expand to circular arc shape and in this fashion extend the sheet attached to the pipes. This provides a simple and effective system which is easy to operate when it is desired to expand. Further, the movable studio vehicle is constructed of light weight parts and is of a design and configuration to improve the ease for expanding and contracting the vehicle.

Even though a particular embodiment of the present invention has been illustrated and described herein. It is not intended to limit the invention and changes, modification may be made therein within the scope of the following claims.

What is claimed is:

1. A movable photo studio vehicle having an interior space for use by persons, comprising a body mounted on a chassis;

a roof actuatable with respect to said body to a raised position defining a portion of said interior space;

a side board hinged on the lower portion of said body in such a manner as to be rotatable by 90° sideways to a horizontal position space from said body to further define in part a portion of said interior space;

a plurality of spaced apart flexible pipes mounted between the end of said side board and the side portion of said roof;

a sheet attached to said pipes; and connecting pipes provided on the side portions of said roof for supplying air wherein a group of said pipes are supplied with air and expanded to thereby extend said sheet to an arcuate position to still further define a portion of said interior space without limiting access to said space.

* * * * *

UNITED STATES PATENT AND TRADEMARK OFFICE
CERTIFICATE OF CORRECTION

PATENT NO. : 5,478,129
DATED : Dec. 26, 1995
INVENTOR(S) : Goto, et al

It is certified that error appears in the above-identified patent and that said Letters Patent is hereby corrected as shown below:

On cover page, item [73] after the Assignee, change "Kinoshita & Iwahashi" to read --S & T Studio Co., Ltd.--.

Signed and Sealed this

Third Day of November, 1998

Attest:

BRUCE LEHMAN

Attesting Officer

Commissioner of Patents and Trademarks